July 22, 1958 B. B. JACOBSEN 2,844,716

RADIO DIVERSITY RECEIVING SYSTEM

Filed March 28, 1957 2 Sheets-Sheet 1

Inventor
B. B. JACOBSEN
By [signature]
Attorney

Inventor
B.B. JACOBSEN
By R. P. Morris
Attorney

United States Patent Office 2,844,716

Patented July 22, 1958

2,844,716

RADIO DIVERSITY RECEIVING SYSTEM

Bent Bülow Jacobsen, London, England, assignor to International Standard Electric Corporation, New York, N. Y., a corporation of Delaware Application March 28, 1957, Serial No. 649,205

Claims priority, application Great Britain April 10, 1956

9 Claims. (Cl. 250—20)

This invention relates to radio diversity receiving arrangements of the type in which the radio energies received simultaneously on a plurality of spaced antennae are brought into a cophasal condition and then combined for joint input to a radio receiver. While the principles of the invention may be applied in any radio communication scheme, the invention is particularly useful in the case of frequency-division multi-channel systems in which the channels utilise respective non-overlapping frequency bands having a collective bandwidth so large that under fading conditions the phasing adjustment of the antenna outputs required to give cophasability over the frequency band of one channel is not necessarily correct for the other channels.

According to the present invention there is provided a radio diversity receiving arrangement of the type in which radio energy particularly to a given communication channel is received on each of two spaced antennae simultaneously and the antenna outputs are combined through adjustable phasing means individual to said given channel prior to demodulation, in which arrangement there are provided local modulating means for differentially phase-modulating the antenna outputs at a given low frequency prior to their combination, means for deriving from the combined antenna outputs the envelope wave of amplitude modulation due to said differential phase modulation, and means for automatically controlling the adjustment of said phasing means according to the phase of the envelope wave component of said given frequency. The said given channel may be one of a plurality of channels all received on both the antennae but occupying respective non-overlapping portions of the frequency spectrum, in which case the said modulating means is applied to differentially modulate collectively all the channel outputs from each of the two antennae, and channel dropping means are provided to select the antenna energies particular to the given channel after said differential phase modulation.

The invention will be better understood from the following description of one embodiment, taken in conjunction with the accompanying drawings, in which.

Figure 1:
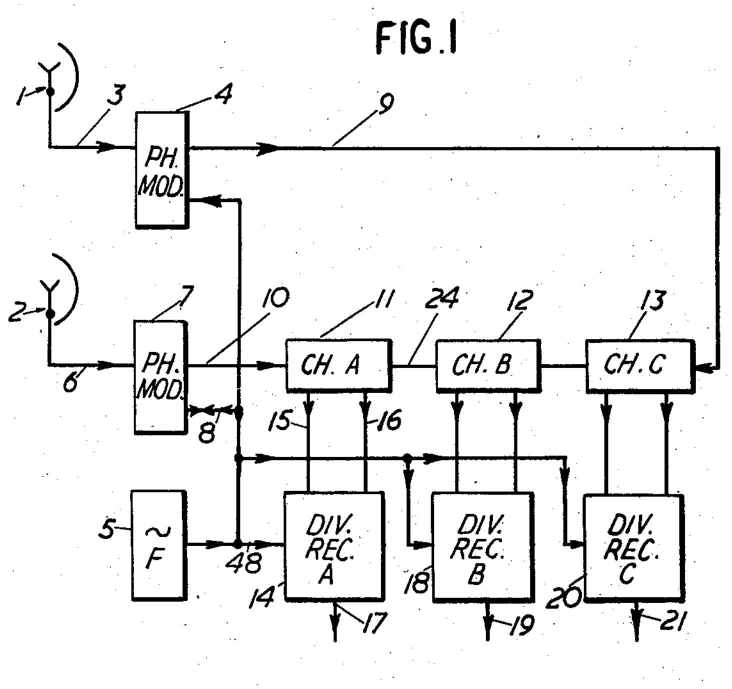
Fig. 1 is a block diagram illustrating the main units in a two-antenna diversity reception arrangement according to the invention, adapted for use in a three-channel communication scheme.

Referring now to the drawings, Fig. 1 shows in block diagram form the main units in a two-antenna diversity reception arrangement according to the invention, for use in a frequency division three-channel communication scheme. The antennae indicated at 1 and 2 are located for space diversity reception, each antenna being adapted for reception over the total frequency band occupied by the three channels which for convenience are designated A, B and C respectively. Output from antenna 1 is fed over line 3 to a phase modulator indicated at 4, in which it is phase-modulated at a low frequency F, of the order of 10 C. P. S. to 100 C./S., by energy derived from a local low frequency source 5. Output from antenna 2 is fed over line 6 to another phase modulator 7, in which it likewise is phase-modulated at frequency F by energy derived from source 5, the phase of this modulation being however, the reverse of that at modulator 4, this reversal of phase being indicated by the cross in the line 8 which feeds the modulating energy to modulator 7. Modulators 4 and 7 are jointly adapted to set up a differential phase modulation of $\pm 10°$ to $\pm 15°$ between the outputs of the two antennae. If convenient, one of the modulators may be omitted, the remaining modulator then being operated at a greater depth of modulation to maintain the desired phase differential. The outputs from modulators 4 and 7 are then applied over lines 9 and 10 respectively to a chain of known channel-dropping devices indicated at 11, 12 and 13, which are described hereinafter with reference to Fig. 2. In the meantime it is sufficient to say that the function of each channel-dropping device is to provide two separate outputs, one per antenna, covering only that part of the frequency spectrum which is occupied by the channel to which that particular channel-dropping device is allotted. Thus, channel-dropping device 11, allotted to channel A, receives the output of phase modulator 7 over line 10 and also separately receives the output of phase modulator 4 over line 9 in series with channel-dropping devices 12 and 13, and provides two outputs which are applied to respective input circuits of a diversity radio receiver 14 over lines 15 and 16, line 15 delivering only the channel A energy derived from antenna 2 via phase modulation 7, and line 16 delivering only the channel A energy derived from antenna 1 via phase modulator 4. In diversity receiver 14, described hereinafter with reference to Fig. 3, the A channel components of the energies derived from the two antennae are combined in phase coincidence and then delivered, after any amplification or other processing that may be necessary, over line 17 to the channel A utilisation circuit (not shown). In similar manner the channel B components are isolated by channel dropping device 12, combined in diversity receiver 18, and ultimately fed to the channel B utilisation circuit over line 19, while diversity receiver 20 combines the channel C components for supply to the channel B utilisation circuit over line 21.

Figure 2:
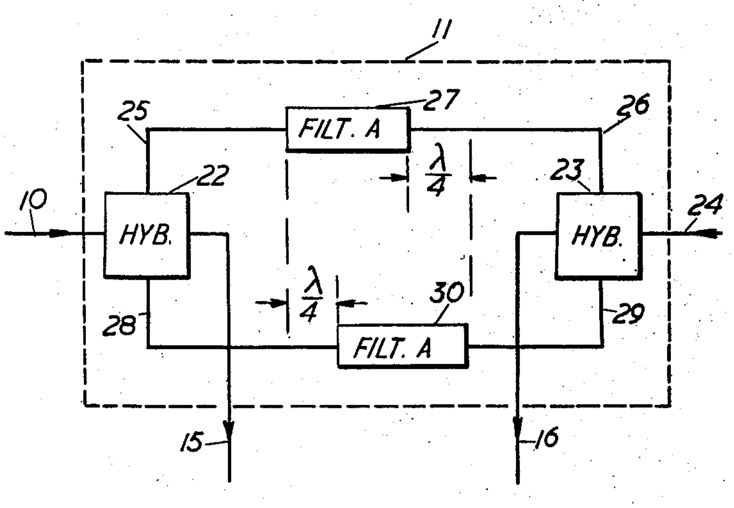
Fig. 2 illustrates in block schematic form a known channel-dropping device suitable for use in the arrangement of Fig. 1.

In Fig. 2 there is illustrated in block schematic form details of a suitable known channel-dropping device as repeated by block 11 in Fig. 1. This device comprises a hybrid network 22 such as a "magic T" waveguide network, one main arm of which is connected to incoming line 10, while the other main arm is connected to output line 15. A second hybrid network 23 has its main arms connected one to output line 16 and the other to incoming line 24 which connects in series with channel-dropping device 12 as shown in Fig. 1. One symmetrical arm of hybrid network 22 is connected over line 25, band rejector filter 27, and line 26 to one symmetrical arm of hybrid network 23, while the remaining symmetrical arms of the two networks are connected together over line 28, band rejector filter 30, and line 29. These filters are each adapted to reject the frequency band occupied by channel A, and to pass freely the frequency bands occupied by the other channels B and C. As indicated on the drawing, the lengths of the connections from hybrid network 22 to filters 27 and 30 are made such as to impose a differential phase shift corresponding to one quarter of the mean wavelength of the channel A frequency band, while the connections from hybrid network 23 to filters 27 and 30 provide a complementary additional phase shift again corresponding to one quarter wavelength, in such manner that the total phase shift in the connection over lines 25 and 26 and filter 27 is equal to the total phase shift in the connection over lines 28 and 29 and filter 30.

The channel-dropping devices 12 and 13 are similar to the device 11 just described, except that in device 12 the filters are adapted to reject the channel B energy and to pass freely the energies of channels A and C, and in device 13 the filters reject the channel C energy but pass freely the energies of channels A and B.

For a more detailed description of the operation of the series-connected channel-dropping scheme, reference may be made to the specification of British Patent No. 753,886.

While the use of series connected channel-dropping device as described above with reference to Figs. 1 and 2 is preferred, it is to be understood that if desired any other channel-dropping arrangement may be used which will provide each of the diversity receivers 14, 18, 20 of Fig. 1 with two separate inputs derived from respective ones of the two antennae, each input including only the energy occupying the frequency band of the one channel allotted to the receiver. In the case of a single channel communication scheme the channel-dropping equipment is of course unnecessary, and the modulated antenna outputs are fed over lines 9 and 10 direct to the input circuits of a single diversity receiver such as indicated at 14.

Figure 3:
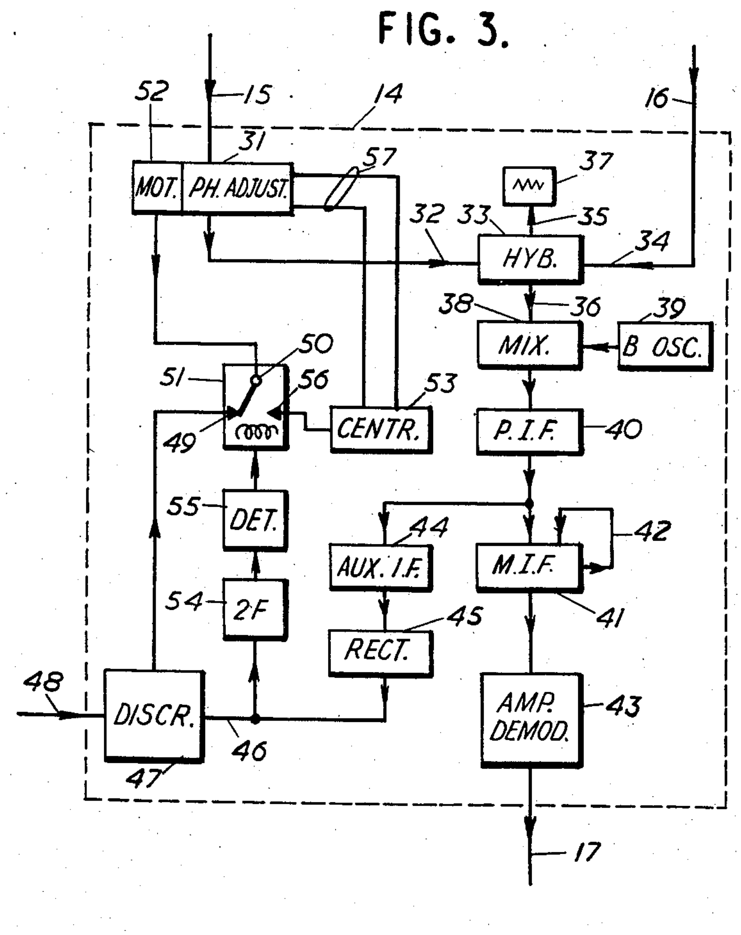
Fig. 3 illustrates in block schematic form the essential details of a diversity radio receiver suitable for use in the arrangement of Fig. 1.

Turning now to Fig. 3, this illustrates in block schematic form the essential details of the diversity receiver 14 of Fig. 1, i. e. that one of the receivers which handles only the channel A energies separately received by the antennae 1 and 2 and separately fed to the receiver over lines 15 and 16. The energy supplied over line 15 is fed via a phase shifter 31, of any convenient known type which is continuously adjustable over a range of about $3\pi$ radians, i. e. somewhat greater than one complete cycle, to a main arm 32 of a hybrid network 33, which may be of the "magic T" pattern. The energy supplied over line 16 is fed to the other main arm 34 of network 33. The symmetrical arms of hybrid network 33 are respectively connected over line 35 to a balancing impedance 37 and over line 36 to a mixer unit 38. If the phase shifter 31 is correctly adjusted, the whole of the A channel energies collected by the two antennae are additively combined in that symmetrical arm which is connected to mixer 38 over line 36. In mixer 38 the combined radio frequency energy is beaten with output from beating oscillator 39 to produce a first intermediate frequency wave which is amplified in preliminary I. F. amplifier 40. It is to be observed here that this preliminary I. F. amplifier does not include any automatic gain control circuit, and its output is therefore amplitude modulated to a slight extent by reason of the differential phase modulation imposed on the antenna outputs by the phase modulators 4 and 7 of Fig. 1.

Part of the output of preliminary amplifier 40 is applied to excite a main intermediate frequency amplifier 41, which includes an automatic gain control feature, illustrated by the feedback connection indicated at 42, adapted to remove the above-mentioned amplitude modulation. The output of main I. F. amplifier 41 thus corresponds to the sum of the antenna energies free of any effect due to the operation of the phase modulators 4 and 7 (Fig. 1), and is passed on to an amplifying and demodulating unit 43 in which it is processed in accordance with known technique to yield the channel A intelligence signal for application over connection 17 to an appropriate utilisation circuit (not shown).

Another part of the (amplitude-modulated) output from preliminary I. F. amplifier 39 is further amplified in an auxiliary I. F. amplifier indicated at 44 and then applied to a rectifier 45 which extracts the envelope of amplitude modulation. If the phase shifter 31 is correctly set, so that the two inputs to hybrid network 36 are combined in the same mean phase, the lowest frequency component in the output of rectifier 45 is a wave of frequency 2F, i. e. twice the frequency of source 5 in Fig. 1. If, on the other hand, the phase shifter 31 is incorrectly set, then the output of rectifier 45 further comprises a wave of frequency F, the phase of which wave depends on the magnitude and sense of the error in setting of phase shifter 31.

Part of the output energy from rectifier 45 is applied over connection 46 to a phase discriminator 47, which also receives a reference input wave of frequency F from the modulation source 5 (Fig. 1) over connection 48, and which gives a D. C. output the sign and magnitude of which is determined by the phase difference between the reference input and the rectifier output component having the same frequency. Under normal operating conditions the discriminator output is applied, over relay contacts 49 and 50 in changeover relay mechanism 51, to operate the reversible D. C. motor 52 in such a direction as to move the adjustment of phase shifter 31 towards the correct position. As the correct position is approached the F component of the output of rectifier 45 becomes smaller, until finally there is no output from discriminator 47, and the motor ceases to operate, leaving the phase shifter adjusted to its correct position. After this has occurred, any change in transmission conditions resulting in change in the mean phase relationships between the outputs of the diversity antennae 1 and 2 of Fig. 1 will result in the reappearance of an F frequency component in the output of rectifier 45 and the motor 52 will be re-energized to correct the setting of the phase adjuster 31 to meet the new transmission conditions.

In addition to the automatic phasing control arrangement just described, the diversity receiver 14 includes means whereby in the event of fading being encountered in one of the antennae, the motor control is switched from the discriminator output to a centralising device 53 which operates the motor 52 in such manner as to move the phase shifter 31 towards its central region, so that when two-antenna reception is assumed the new correct adjustment may be arrived at more quickly than if, as is quite possible, the phase adjuster had remained stationary near one end of its range after the fade had commenced. To this end part of the output energy from rectifier 45 is applied to a filter 54 which selects the component of frequency 2F, and passes on this selected component to an amplitude detector 55, the output of which operates a relay in change-over relay mechanism 51 to close contacts 49 and 50 during normal operation. When only one of the two antennae is active, however, the operation of the phase-modulators 4 and 7 of Fig. 1 does not give rise to any amplitude modulation at the output arm 36 of hybrid network 34 (Fig. 3) and there is no output from detector 55. Accordingly the relay in change-over mechanism 51 takes up its non-operated position to connect contact 50 to contact 56 instead of contact 49, thereby transferring the control of motor 52 from discriminator 47 for centralising device 53. This device is adapted to supply at contact 56 a continuous current which will operate motor 52 only for such a time as is necessary to change the setting of phase adjuster 31 by $\pi/2$ radians. The direction of rotation, determined by the polarity of the supply, is conveniently controlled over line 57 by a mechanical reversing contact operated by the phase shifter itself so that it is always such as to move the adjustment away from that one of the two extreme positions which was the nearer to the setting of the adjustment at the time when the change-over mechanism 51 switched over the motor control from discriminator 47 to centralising device 53. If desired the reversing contact mechanism may include a hysteresis feature such that the reversal would not occur until the phase shifter adjustment had reached a value of $+\pi/2$ radians for one range of movement or $-\pi/2$ radians for the reverse range of movement, both values being relative to the central adjustment. This would give an overlap of $\pi$ radians between the two ranges of movement.

The diversity radio receivers 18 and 20 of Fig. 1 are similar to diversity radio receiver 14 as described above, in all respects save that the electrical constants of the apparatus are adapted to deal with the frequency bands allotted to channels B and C.

While the principles of the invention have been described above in connection with a single embodiment, it is to be clearly understood that this description is made only by way of example and not as a limitation to the scope of the invention.

What I claim is:

1. A radio diversity receiving arrangement of the type in which radio energy particular to a given communication channel is received on each of two spaced antennae simultaneously and the antenna outputs are combined through adjustable phasing means individual to said given channel prior to demodulation, comprising local modulating means for differentially phase-modulating the antenna outputs at a given low frequency prior to their combination, means for deriving from the combined antenna outputs the envelope wave of amplitude modulation due to said differential phase modulation, and means for automatically controlling the adjustment of said phasing means according to the phase of the envelope wave component of said given frequency.

2. A radio diversity receiving arrangement according to claim 1, wherein said given channel is one of a plurality of channels occupying respective non-overlapping portions of the frequency spectrum and all received on each of said two antenna, and wherein said local modulating means is applied to differentially modulate all the antenna channel outputs collectively, channel-dropping means being provided to select the antenna energies particular to said given channel after said differential modulation.

3. A radio diversity receiving arrangement for a single-channel radio communication system, comprising two antennae spaced for diversity reception, local means for differentially phase modulating at a given low frequency the outputs of said two antennae, a diversity radio receiver having two input circuits, and means for applying the locally modulated antenna outputs to respective ones of said input circuits, said radio receiver comprising means including adjustable phasing means for cophasally combining the modulated antenna outputs for joint demodulation, means for deriving from the amplitude modulation envelope of the combined outputs a wave of said given low frequency, and means responsive to the phase of said derived wave for automatically controlling the adjustment of said phase shifting means.

4. A radio diversity receiving arrangement for a multichannel radio communication system whose channels occupy respective non-overlapping frequency bands, said arrangement comprising two antennae spaced for diversity reception, local means for differentially phase modulating at a given low frequency the outputs of said two antennae, means for selecting from the said differentially modulated output of each antenna separately the signal energies individual to each said channel, a plurality of diversity radio receivers each associated with a particular one of the communication channels and having two input circuits, and means for applying to each input circuit of a said receiver a respective one of the selected signal energies individual to the associated channel, each said receiver comprising means including adjustable phasing means for cophasally combining the two input signal energies for joint demodulation, means for deriving from the amplitude modulation envelope of the combined energies a wave of said given low frequency, and means responsive to the phase of said derived wave for automatically controlling the adjustment of said phase shifting means.

5. An arrangement according to claim 3 in which said means for cophasally combining the two input signal energies in each said receiver comprises a hybrid network device having two input arms and two symmetrical output arms, means coupling said two input arms to respective ones of said input circuits, one of said output arms serving to supply said combined outputs, and the other of said output arms being coupled to a balancing impedance, said coupling means including said adjustable phasing means.

6. An arrangement according to claim 3 in which in each said receiver the adjustable phasing means comprises a phase shifting device continuously adjustable over at least $2\pi$ radians of phase change, and said means for automatically controlling the adjustment of said phase shifting device comprises an adjusting motor, a two-input phase discriminator adapted to provide a D. C. output, means for applying said derived wave and a reference wave of said given low frequency as inputs to said phase discriminator, with means for applying the discriminator output to operate said adjusting motor.

7. An arrangement according to claim 6, wherein each said receiver further comprises means for selecting from said derived wave the component of twice said given low frequency, means for applying said selected component to operate a switching device in the control circuit of said motor in such manner that non-operation of said switching device transfers control of operation of said motor from the output of said discriminator to an auxiliary driving source adapted to operate said motor in such manner that the phase shifting device is automatically adjusted to an approximately central position.

8. An arrangement according to claim 4 in which said means for differentially phase modulating the outputs of the two antennae comprises an energy source of said given low frequency, a phase-modulator means connected into the output circuit of one of said antennae, and means for applying energy from said source to said modulator to modulate the output of said one antenna over the whole of the desired range of differential modulation.

9. An arrangement according to claim 4 in which said means for differentially phase modulating the outputs of the two antennae comprises an energy source of said given low frequency, two phase modulator means connected each into the output circuit of a respective said antenna, and means for applying energy from said source to both said phase modulators in such manner as to modulate said two antenna outputs to substantially equal extents but in opposite senses.

References Cited in the file of this patent

UNITED STATES PATENTS

| | | |
|---|---|---|
| 2,042,831 | Crosby | June 2, 1936 |
| 2,505,266 | Villem | Apr. 25, 1950 |
| 2,624,834 | Atwood | Jan. 6, 1953 |
| 2,629,816 | Rabuteau | Feb. 24, 1953 |